United States Patent Office 2,895,863
Patented July 21, 1959

2,895,863

ARC WELDING FLUX COMPOSITION

Leonidas K. Stringham, Shaker Heights, and Paul E. Jerabek, Euclid, Ohio, assignors to The Lincoln Electric Company No Drawing. Application September 30, 1955
Serial No. 537,898

7 Claims. (Cl. 148—26)

This invention pertains to the art of arc welding fluxes for steel and more particularly to an improved composition for a flux of the type to be deposited on a weld seam while an arc is maintained below the pile to deposit a weld bead.

The present invention constitutes in some respects an improvement on the flux disclosed in our co-pending patent application, Serial No. 245,258, filed September 5, 1951, now Patent No. 2,719,801, dated October 4, 1955.

In that application there is disclosed and claimed a flux composition having appreciable amounts of sand or silicon dioxide as one of its principal ingredients, such flux consisting of sand and the other flux ingredients, all in finely ground, uniformly distributed state and bound into free flowing, granular flux particles. This flux has proven to be extremely practicable and millions of feet of high quality welds have been produced using it.

One difficulty exists with this flux, however, namely, that the surface of the weld was generally speckled or spotted with tiny, silvery and shiny spots which were generally convex to the surface. Metallurgical and physical tests proved that these spots existed on the surface only and did not adversely affect the desired characteristics of the weld. However, some welders objected to their presence.

The present invention contemplates a welding flux composition which produces sound welds, which do not have the spots or freckles above referred to.

In accordance with the present invention, a flux composition is provided wherein silicon dioxide, a usual flux ingredient, is replaced entirely or almost entirely by zirconium orthosilicate, hereinafter referred to as zircon which is present in substantial amounts, the silicon dioxide being present if at all in amounts less than 5%.

Thus, in accordance with the invention, a welding flux composition is provided consisting of principal ingredients, namely basic ingredients selected from the class of oxides of manganese, titanium, magnesium and aluminum, and acid ingredients selected from the class of zircon and silicon dioxide, said silicon dioxide being present in an amount less than 5%.

Such ingredients, in accordance with the invention, are all finely ground, thoroughly intermixed and bound without chemically reacting them into free-flowing granules. A binder may be employed for this purpose such as a binder selected from the class of sodium silicate and potassium silicate. These are usually added as 40% water solutions, the water being driven off in the drying kiln.

The terms, base and acid ingredients are those normally used in steel making and the base and acid ingredients are employed in the flux, generally in a combining ratio, that is to say, if the ingredients are melted down in the heat of the arc and allowed to react one with the other, a neutral product results. Obviously certain of the basic ingredients are more basic than others and as the amounts of the various basic ingredients are varied, the amount of the acid ingredients will have to be varied likewise. In some cases the oxides of aluminum and titanium may act as acid ingredients, as set forth in our copending application, Serial No. 369,213, filed July 20, 1953, now Patent No. 2,814,579, issued November 26, 1957, but are here considered as basic for the purpose of defining the invention.

The silicon dioxide is preferably omitted entirely from the flux composition. It has been found, however, that if sand introduced into the composition, either as impurities of the other flux ingredients or intentionally introduced, is present in total amounts less than 5%, the spots of speckles on the surface of the ultimate weld bead are not present. Above this amount the spots reappear in increasingly greater amounts as the amount of silicon dioxide is increased.

The zircon, which is the principal acid ingredient, should be present in substantial amounts, that is to say, in amounts in excess of 25% of the total weight of the flux ingredients.

The flux ingredients may, and preferably do, include as a minor ingredient fluorides selected from the class of sodium and calcium fluorides. The fluorides, as far as understood, do not enter into the reaction between the basic and acid ingredients but they do have a beneficial effect on the welding operation and are therefore included, their use being conventional in welding fluxes of this type.

The flux composition also may, and preferably does, include as a minor ingredient a killing agent such as one selected from the class of ferrosilicons and silico manganese or the equivalent, which killing agents occupy a similar relation to the flux as do the fluorides. Aluminum and silicon and to a lesser degree manganese, chromium and vanadium metals in small amounts are also known killing agents. In greater amounts they become alloying agents.

The quantity of killing agent employed depends upon the percentage of active ingredients which it contains and its efficiency in combining with oxygen. In the proportions to be stated hereinafter, it will be assumed that the ferro alloys as killing agents contain 50% active ingredients, it being appreciated that if less or more active ingredients are present a proportionately larger or smaller quantity will be required.

The invention also contemplates that various alloying ingredients may be included in the flux composition up to about 60% of the final product. If such alloying agents in the form of chromium, vanadium or manganese are employed, they may then replace some or all of the killing agent.

The manganese oxide employed may be conventional manganese oxide ore containing approximately 50% manganese and the formulations hereinafter set forth will be based on manganese ore with percentages of manganese.

The magnesium oxide is preferably a dead-burned magnesite, while the aluminum oxide is a commercial grade such as calcined bauxite.

Titanium dioxide is normally added as rutile but could be added as a titanate such as "Perovskite" having the general formula $CaTiO_3$, in which case the calcium oxide of the formulation would act to replace some of the magnesium oxide.

It is to be pointed out that calcium oxide as a separate, uncombined ingredient is not suitable for use in the present flux, particularly when a potassium or sodium silicate solution binder is employed. The calcium oxide combines with the water in the binder to form calcium hydroxide which is undesirable.

All of the ingredients employed should be finely ground either prior to or during the mixing operation, the degree of fineness of the grind being as desired. Preferably, however, the zircon should be milled to a powder in order to obtain maximum benefits from its use. It thus has a maximum surface area for reaction with the base ingredients in the heat of the arc.

The ingredients are all preferably placed in a rotary kiln and tumbled in the presence of sufficient heat to drive off any moisture and bind the particles into granules of the desired size, each granule then containing approximately the same proportion of each ingredient. It is important that the heating be controlled so that no, or a minimum of, reaction occurs between the ingredients. A temperature of around 1500° F. has been found satisfactory. At this temperature the silicate binder begins to fuse and binds the other ingredients into granules in the unfused and unreacted state.

The following are typical usable ranges of flux compositions made in accordance with the present invention, in percents by weight:

|  | As Mixed | After Drying |
|---|---|---|
| Zircon (ZrSiO₄) | 25-40 | 27-44 |
| MgO | 0-30 | |
| Mn Oxide Ore (50% Mn) | 0-45 | 20-45 / 22-50 |
| Al₂O₃ | 0-25 | 0-27 |
| TiO₂ | 0-20 | 0-22 |
| CaF₂ | 2-20 | 2-22 |
| 50% Ferro-Silicon (Killing Agt.) | 1-7 | 1-8 |
| Sodium Silicate (40% solution) | 10-17 | 4-8 |

A more preferred range is as follows in percents by weight:

|  | As Mixed | After Drying |
|---|---|---|
| Zircon (ZrSiO₄) | 27-36 | 30-39 |
| MgO | 0-27 | |
| Mn Oxide Ore (50% Mn) | 0-32 | 22-40 / 22-44 |
| Al₂O₃ | 0-20 | 0-22 |
| TiO₂ | 0-12 | 0-13 |
| CaF₂ | 3-12 | 3-14 |
| 50% Ferro-Silicon (Killing Agt.) | 1-6 | 1-7 |
| Sodium Silicate (40% solution) | 11-16 | 5-8 |

A specific flux composition for high speed steel welding and coming within the above stated ranges, and constituting a preferred embodiment of the invention is as follows in parts by weight:

|  | As Mixed | After Drying |
|---|---|---|
| Zircon (ZrSiO₄) | 31 | 33.9 |
| MgO | 7 | 7.6 |
| Mn Oxide Ore (50% Mn) | 25.5 | 27.9 |
| Al₂O₃ | 7 | 7.6 |
| TiO₂ | 7 | 7.6 |
| CaF₂ | 3.5 | 3.8 |
| 50% Ferro-Silicon (Killing Agt.) | 5 | 5.5 |
| Sodium Silicate (40% solution) | 14 | 6.1 |
|  | 100.0 | 100.0 |

As above indicated, alloying ingredients may be added to the flux ingredients to the extent of about 60% by weight of the final product. Such alloying ingredients are chromium, vanadium, manganese, nickel, molybdenum, cobalt, copper, tungsten or columbium and the like added as elements, alloys or compounds. Normally when such ingredients are employed, the preferred proportions of the flux ingredients should be varied slightly although still within the broad ranges above indicated.

A preferred flux composition for use with such alloys is as follows in parts by weight (before adding the alloying ingredients):

|  | As Mixed | After Drying |
|---|---|---|
| Zircon (ZrSiO₄) | 31 | 34.0 |
| MgO | 24 | 26.4 |
| Mn Oxide Ore (50% Mn) | 6 | 6.6 |
| Al₂O₃ | 14 | 15.4 |
| CaF₂ | 8 | 8.8 |
| 50% Ferro-Silicon (Killing Agt.) | 2 | 2.2 |
| Sodium Silicate (40% solution) | 15 | 6.6 |
|  | 100 | 100.0 |

The ingredients named are brought together in the proportions stated. Thereafter the desired alloying ingredient or ingredients in a previously determined ratio and amounts are added to the wet mixture and thoroughly mixed therewith. Thereafter the mixture is heated in a suitable drying means, such as a rotary kiln, until all or substantially all moisture has been driven off and the sodium silicate as above indicated has commenced to fuse in which case the named ingredients, including the alloying ingredients, are all bound together in a thoroughly intermixed, unreacted condition into free flowing particles or granules, the size of the particles being as desired which may generally be determined by the amount of tumbling, temperatures employed, and the like. As the size of the particles and the drying process form no part of the present invention, they will not be discussed further herein.

Using such a flux composition, with the added alloying ingredients, it is possible to employ an ordinary low carbon steel electrode having no or a minimum of alloying ingredients for the purpose of welding an alloy steel and obtain a weld bead deposit of the same alloy as the metal being welded or any other desired alloy.

By varying the amounts of alloying ingredients, the alloy composition of the final deposit on the weld bead may be controlled.

It will be noted that in all of the formulations given above, silicon dioxide is missing entirely which is a preferred embodiment of the invention.

As before stated, silicon dioxide can be tolerated in amounts up to 5% particularly if a very high grade manganese ore containing a low percentage of free silicon dioxide is employed.

Flux compositions compounded in accordance with the above description have proven successful in practice and have produced sound welds, and in particular, have produced welds free of surface speckles or spots.

Obviously other known flux ingredients in minor amounts, either as impurities or introduced intentionally as equivalents of the ingredients specified, may be included in the compositions without departing from the scope of the invention as defined in the claims.

Principally, in accordance with the invention, the silicon dioxide previously conventionally used in welding fluxes has been entirely or almost entirely replaced by zircon which is an essential ingredient of the flux.

Having thus described our invention, we claim:

1. A welding flux composition consisting of the following named ingredients, bound together in a finely ground, uniformly distributed condition into free flowing, granular particles, namely basic ingredients selected from the class of oxides of magnesium, manganese, aluminum, titanium in amounts of from 22 to 66%, fluorides selected from the class of calcium fluoride and sodium fluoride in amounts of from 2% to 22%; a killing agent selected from the class of ferro manganese, ferro silicon, aluminum, chromium, vanadium, manganese and silicon in amounts of from 1 to 8%, and acid ingredients selected from the class consisting of silicon dioxide and zircon, said acid ingredients being in approximately combining ratio with said basic ingredients but said silicon dioxide being present in amounts less than 5% of the total weight of the ingredients.

2. A welding flux composition consisting of the following ingredients in finely divided, uniformly distributed condition and bound together into free flowing, granular particles, namely basic ingredients selected from the class of oxides of manganese, magnesium, aluminum and titanium in amounts of from 22 to 66%, fluorides selected from the class of calcium fluoride and sodium fluoride in amounts of from 2% to 22%; a killing agent selected from the class of ferro silicon, ferro manganese, chromium, vanadium, aluminum, silicon and manganese in amounts of from 1 to 8%; a binder selected from the class of sodium silicate and potassium silicate in amounts of from 5% to 8% and an acid ingredient selected from the class of zircon and silicon dioxide, said zircon being present in amounts from 27 to 44% and said silicon dioxide being present in amounts less than 5%.

3. A welding flux composition consisting of the following named ingredients in approximately the stated proportions in percent by weight after drying, all of said ingredients being finely ground and bound together in uniformly distributed condition into free flowing, granular particles:

| | |
|---|---|
| Zircon ($ZrSiO_4$) | 27–44 |
| MgO and MnO | 22–50 |
| $Al_2O_3$ | 0–27 |
| $TiO_2$ | 0–22 |
| $CaF_2$ | 2–22 |
| 50% ferro-silicon (killing agent) | 1– 8 |
| Sodium silicate | 4– 8 |

4. A welding flux composition consisting of the following named ingredients in approximately the stated proportions in percent by weight after drying, all of said ingredients being finely ground and bound together in uniformly distributed condition into free flowing, granular particles:

| | |
|---|---|
| Zircon ($ZrSiO_4$) | 33.9 |
| MgO | 7.6 |
| Mn oxide ore (50% Mn) | 27.9 |
| $Al_2O_3$ | 7.6 |
| $TiO_2$ | 7.6 |
| $CaF_2$ | 3.8 |
| 50% ferro-silicon (killing agent) | 5.5 |
| Sodium silicate binder | 6.1 |

5. A welding flux composition consisting of the following named ingredients in approximately the stated proportions in percent by weight after drying, all of said ingredients being finely ground and bound together in uniformly distributed condition into free flowing, granular particles:

| | |
|---|---|
| Zircon ($ZrSiO_4$) | 34.0 |
| MgO | 26.4 |
| Mn oxide ore (50% Mn) | 6.6 |
| $Al_2O_3$ | 15.4 |
| $CaF_2$ | 8.8 |
| 50% ferro-silicon (killing agent) | 2.2 |
| Sodium silicate binder | 6.6 |

6. The combination of claim 3 wherein said flux also includes metals capable of alloying with steel selected from the class of manganese, chromium, vanadium, nickel, molybdenum, cobalt, copper, tungsten and columbium, up to 60% of the total weight of the flux.

7. In a welding flux composition wherein all of the ingredients are finely ground and bound together in uniformly distributed condition into free-flowing granular particles, wherein said flux contains basic ingredients selected from the class consisting essentially of oxides of magnesium, manganese, aluminum and titanium, in amounts greater than 22% the improvement which consists including in such ingredients zircon in amounts of from 27–44% and limiting the amount of silicon dioxide in the ingredients to less than 5%, all in parts by weight of the total.

References Cited in the file of this patent

UNITED STATES PATENTS

| | | |
|---|---|---|
| 1,905,081 | Woods | Apr. 25, 1933 |
| 1,909,218 | Notvest | May 16, 1933 |

FOREIGN PATENTS

| | | |
|---|---|---|
| 149,088 | Australia | Nov. 19, 1952 |

OTHER REFERENCES

Basic Open Hearth Steelmaking, Seeley W. Mudd Series. A.I.M.E., pages 498–499, 1944.

Manuel C. Roas: Outline of Practice Relative to "Markush" Claims, Journal of Patent Office Society, May 1952.

Henderson, J. G., et al.: Metallurgical Dictionary, 1953, Reinhold Publishing Co., page 103.